W. E. HALE.
BRAKE MECHANISM FOR WINDING DRUMS.
APPLICATION FILED MAY 14, 1921.
1,433,371. Patented Oct. 24, 1922.
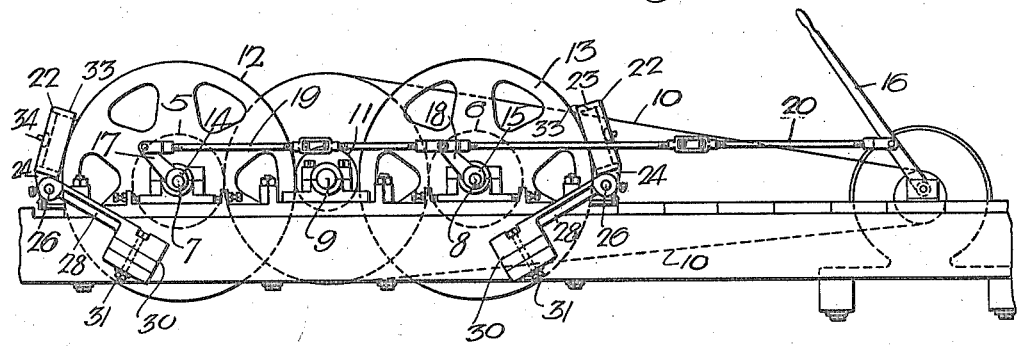
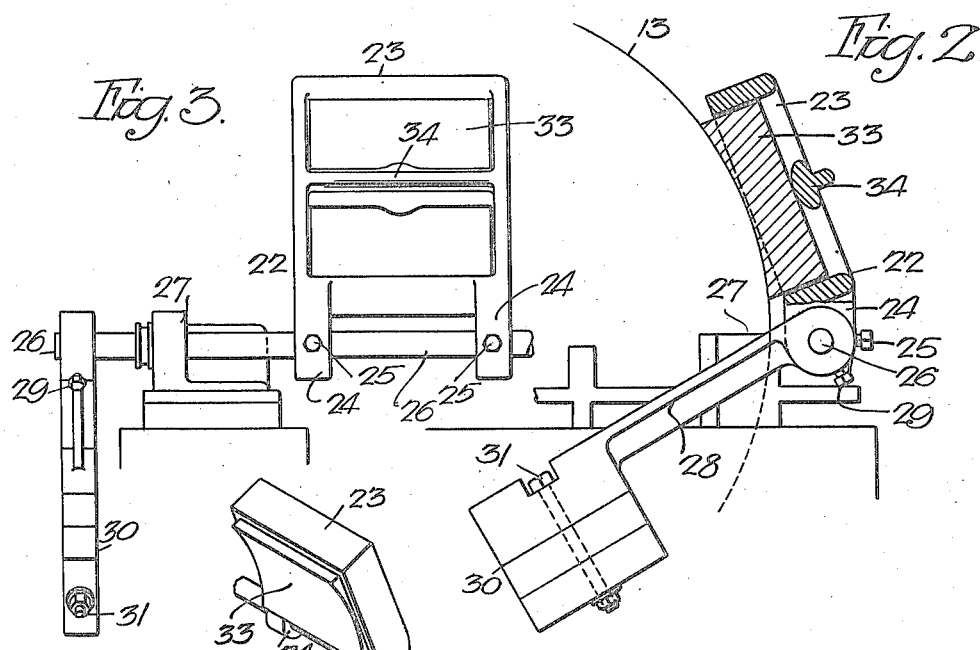
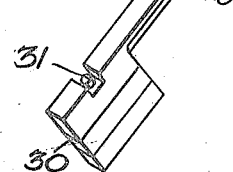
Inventor—
William E. Hale.
by his Attorneys
Howson & Howson Patented Oct. 24, 1922.

1,433,371

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSLYVANIA, A CORPORATION OF PENNSYLVANIA.

BRAKE MECHANISM FOR WINDING DRUMS.

Application filed May 14, 1921. Serial No. 469,723.

*To all whom it may concern:*

Be it known that I, WILLIAM E. HALE, a citizen of the United States, residing in Fort Washington, Pennsylvania, have invented certain Improvements in Brake Mechanism for Winding Drums, of which the following is a specification.

My invention relates to brake mechanism for winding drums and other rotary members; one object of my invention being to provide for automatic adjustment of the brake shoe member to bear properly against the cooperating relatively moving friction surface. Other objects and advantages of my invention will appear from the description, reference being had to the accompanying drawings, in which—

Fig. 1 is a side elevation of a winding apparatus with my present invention applied thereto;

Fig. 2 is an enlarged view of the brake mechanism, certain parts being in section;

Fig. 3 is a face view of the brake device;

Fig. 4 is a perspective view of the principal parts shown of the brake;

The winding drums 5, 6 are mounted on shafts 7, 8 at either side of a central shaft 9 which is driven by a belt drive 10. The shaft 9 carries a friction wheel 11 with which rotary friction wheels 12, 13 on the shafts 7, 8 are adapted to engage. The ends of the shafts 7, 8 are mounted in eccentric bearings 14, 15. On the bearing 14 is an arm 17 and on the bearing 15 is an arm 18 and the two arms are connected by a link 19. An operating lever 16 is connected to the link and the arms by a rod 20. On operating the lever one or the other of the wheels 12 and 13 can be shifted into frictional contact with the driving wheel 11.

On the periphery of each of the rotary friction members 12, 13 bears a movable brake device 22 which does not interfere with either the winding or the slacking off of the cable, but merely serves to prevent the idle winding drum 5 or 6 from rotating and paying out cable too freely, so as to allow the cable connected between the winding drums to become too slack.

Referring, now, to Figs. 2, 3 and 4 as well as Fig. 1, it will be seen that each brake device 22 comprises a frame 23 with lugs 24 and set-screws 25 whereby it is secured to a rock shaft 26 which is mounted in bearings 27 on the machine frame (only one of these bearings appears in Fig. 3). An arm 28 is secured to the rock shaft 26 by a set screw 29, and is loaded with weights 30 (in part secured thereto by a bolt 31). By this means, the frame 23 is moved toward the periphery of the rotary friction member 12 or 13, as the case may be, with force sufficient to create the necessary frictional resistance to the unwinding motion of the drum 5 or 6.

The frame 23 has a cross bar 34 provided with a curved face against which rests a brake shoe 33 which is loosely mounted in the frame and has a curved face which rests against the friction wheel, as shown in Fig. 2. This construction allows the shoe to accommodate itself to the drum. By mounting the frame on the rock shaft 26 as shown it can be readily adjusted in respect to the friction wheel, and the weighted arm can also be adjusted so the proper pressure can be maintained.

I claim:

1. In a friction brake, the combination of a friction wheel, a rock shaft, a frame thereon having a cross bar with a curved surface, a shoe loosely mounted in the frame and arranged to rock on the curved surface of the cross bar to accommodate itself to the surface of the friction wheel.

2. In a friction brake, the combination of a friction wheel, a rock shaft, a frame secured to the shaft in line with the wheel, a bar at the back of the frame extending parallel with the shaft, a brake shoe loosely mounted in the frame and arranged to rock on the bar, the face of the shoe fitting the surface of the wheel, and a weighted arm on the shaft, tending to keep the shoe in contact with the wheel.

WILLIAM E. HALE.